United States Patent

Byrns et al.

[15] 3,693,117

[45] Sept. 19, 1972

[54] PHASE STABLE VARIABLE ATTENUATOR

[72] Inventors: Robert E. Byrns, 107 Shoreview Dr., Liverpool, N.Y. 13088; Hugh W. Gouldthorpe, Nelson Rd., R.D. 3, Cazenovia, N.Y. 13035; Vernon L. Lamison, 13 Hucklebury Lane, Liverpool, N.Y. 13088

[22] Filed: March 25, 1971

[21] Appl. No.: 127,904

[52] U.S. Cl. ......................333/81 R, 323/76, 323/93, 334/78

[51] Int. Cl. ...............................................H03h 7/10

[58] Field of Search ........333/81, 70, 76; 334/78, 81, 334/83; 323/76, 77, 81, 93, 128

[56] References Cited

UNITED STATES PATENTS

| | | | |
|---|---|---|---|
| 2,711,510 | 6/1955 | Tricebock | 323/77 X |
| 2,269,612 | 1/1942 | Turner | 333/70 R X |
| 1,866,456 | 7/1932 | Fichandler | 333/70 R X |

FOREIGN PATENTS OR APPLICATIONS

| | | | |
|---|---|---|---|
| 37,226 | 7/1930 | France | 334/83 |

*Primary Examiner*—Paul L. Gensler
*Attorney*—Charles K. Wright, William G. Capcynski, Lawrence A. Neureither, Leonard Flank, William P. Murphy and Robert C. Sims

[57] ABSTRACT

Attenuation with minimal phase shift of a given frequency is provided by primary and secondary tank stages having a common differential capacitor which provides the tuning. At zero setting of capacitor both tank stages have a resonant frequency equal to the given frequency. Upon adjustment of the capacitor, the resonant frequency of one tank stage increases by an amount equal to the decrease of the other tank stage.

1 Claim, 4 Drawing Figures

Robert E. Byrns
Hugh W. Gouldthorpe
Vernon L. Lamison,
INVENTORS.

BY
William Murphy
Robert C. Sims

PHASE STABLE VARIABLE ATTENUATOR

BACKGROUND OF THE INVENTION

This invention is related to the field of attenuation, and more particular to an attenuator which does not change the phase of the input signal as it attenuates it. This change in phase of an attenuated signal has been a problem before this invention.

SUMMARY OF THE INVENTION

This invention encompasses the use of double tuned circuits to attain required tuning for phase stable signal attenuation. A differential capacitor is capacitively coupled to double tuned circuits. One set of its stator plates is connected to a primary stage, and the other set is connected to the secondary stage of the circuit. Both the primary and the secondary tank stages are resonant at a given frequency when the differential capacitor's rotor plates are centered and meshed with the secondary stage stator plates. The two tank stage capacitances both change when the differential capacitor rotor plates are rotated. The primary tank capacitance increases when the secondary tank capacitance decreases and vice versa. It can be seen from this that the resonant frequencies of the two tank stages shift in opposite directions; therefore the phase shifts caused by tank stages are in opposite directions. One stage causes a negative phase shift while the other stage causes a positive phase shift. This provides a minimal phase shift of any input signal as the phase shifts caused by the attenuator are approximately equal to each other in amplitude. From the above it can be seen that the present invention can provide attenuation of an input signal without loss of phase information by the positioning of a differential capacitor.

DESCRIPTION OF THE PREFERRED EMBODIMENTS

Figure 1:
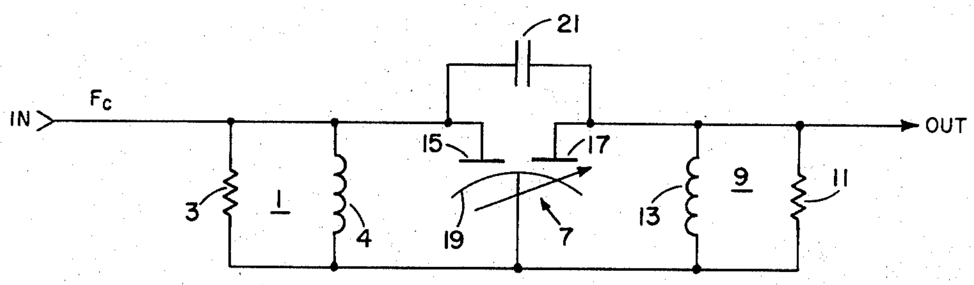
FIG. 1 is a schematic diagram of a basic embodiment of the present invention.

The basic invention is shown in FIG. 1 wherein an input signal of a selected frequency Fc is connected directly to a resonant circuit which shall be called primary tank stage 1. Primary tank stage 1 is made up of resistor 3, inductor 4, and part of differential capacitor 7. Differential capacitor 7 may be any of the well known differential capacitors, such as one having two sets of stator plates off set from each other in a circle and a rotor set of plates which meshes with the stator plates and is rotable in said circle. A second resonant circuit called the secondary tank stage 9 is made up of resistor 11, inductor 13, and part of differential capacitor 7. Inductors 4 and 13 have equal inductance. Differential capacitor 7 has a first stator plate (or set of plates) 15 connected to primary tank stage 1 and a second stator plate (or set of plates) 17 connected to secondary tank stage 9. A rotor plate (or set of plates) 19 is common connected to both the primary and secondary stages. A coupling capacitor 21 may be provided to give some signal bypass at high attenuation so as to provide less than critical coupling.

Figure 2:
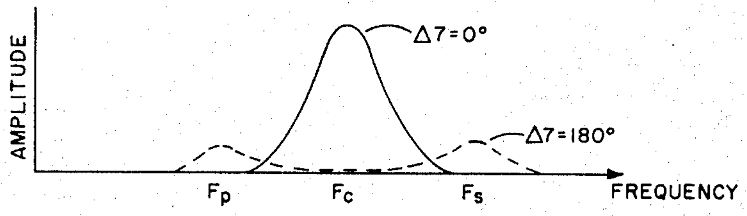
FIG. 2 is a waveform of the circuit of FIG. 1 showing the amplitude of the output on the ordinate and the frequency on the abscissa.
Figure 3:
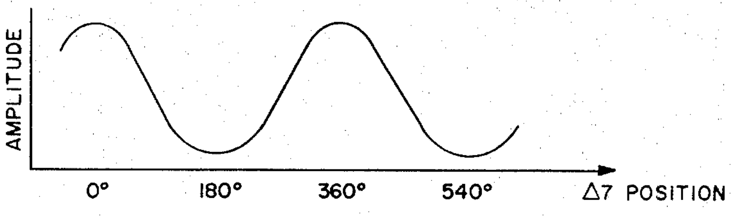
FIG. 3 is a waveform of the circuit of FIG. 1 showing the amplitude of the output on the ordinate and the capacitor position in degrees on the abscissa.

The operation of the attenuator of FIG. 1 can be understood with reference to FIGS. 2 and 3. When the rotor plate 19 of differential capacitor is centered about stator plates 15 and 17, both the primary tank stage 1 and the secondary tank stage 9 are resonant at a frequency Fc. This frequency Fc is selected by design selection of equal values of inductance of coils 4 and 13 which will equal the capacitance between rotor and stator plates at center position and at frequency *Fc* as this is the frequency of the input signal which is to be attenuated. This center position of the rotor plate arbitrarily defined as 0°. The resultant minimal attenuation waveform of the output of the attenuator for frequency Fc with differential capacitor 7 set in the 0° position is shown by the solid curve in FIG. 2. The input frequency is varied to obtain the information in FIG. 2. When differential capacitor 7 is set in the 180° position, the capacitance at plate 15 (F*p*) will be at its maximum, and the capacitance at plate 17 (F*s*) will be at its minimum. Therefore, maximum attenuation for an input frequency Fc is obtained as the resonant frequency of the primary stage has been lowered to F*p* and the resonant frequency of the secondary stage has been raised to F*s*. It can be seen from this that with rotation of the rotor of differential capacitor 7 the primary tank resonant frequency decreases and the secondary tank resonant frequency increases. The phase shifts caused by the two tank stages will, therefore, be in opposite directions. The primary stage causes a negative phase shift, and the secondary stage causes a positive phase shift. This results in minimal phase shift of the input signal (at frequency F*c*) by virtue of the +− phase shift summation. FIG. 3 shows the response of the attenuator as a function of the position of the differential capacitor 7. The waveform of FIG. 3 is that of a sine wave. It should be noted that with the use of certain well known differential capacitors the maximum attenuation will occur at 90° rotation of the stator plate and minimal attenuation will be repeated at 180° as the resonant frequency of the primary stage will increase after the 90° position and the secondary stage resonant frequency will decrease. Both being resonant at F*c* again at the 180° position of the rotor. Upon continual rotation past the 180° position to 270° position maximum attenuation is again obtained with the primary resonant being at the Fs value and the secondary resonant frequency being at the F*p* value. The rotation cycle is completed with both resonant frequency values returning to the F*c* value at 360° position.

Figure 4:
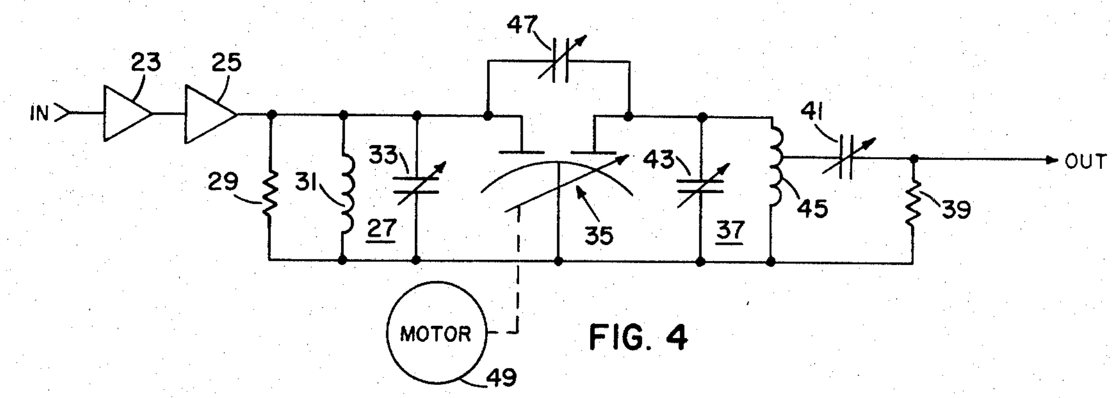
FIG. 4 is a schematic diagram of a more detail embodiment of the present invention.

FIG. 4 shows a more detailed application of the invention. A common emitter stage amplifier 23 has the input signal fed to its input and its output is connected to the input of amplifier 25 which forms a common base buffer stage. The output of amplifier 25 is connected to primary tank stage 27. Primary tank stage 27 is made up of resistor 29, inductor 31, adjustable capacitor 33 and part of differential capacitor 35. A secondary tank stage 37 is made up of resistor 39, adjustable capacitors 41 and 43, tapped inductor 45, and part of differential capacitor 35. Inductors 31 and 45 have equal inductance. An adjustable coupling capacitor 47 may be provided as in FIG. 1 to level the output. Differential capacitor 35 is driven by a motor 49 in response to means not shown. The operation of the circuit of FIG. 4 is essential the same as that of FIG. 1 with some differences. The attenuator of FIG. 4 may be used to attenuate more than one given frequency by the adjustment of trimmer capacitors 33, 43 and 45. Given the input frequency to be attenuated, the trimmer capacitors are adjusted so as to make the primary and secondary tank circuits resonant at that frequency when differential capacitor is positioned at 0°. Capacitor 41 is connected to the tapped inductor so as to provide secondary Q adjustment. A similar adjustable capacitor may be added to the primary tank stage 27. Tapped inductor 45 provides impedance matching.

We claim:

1. An attenuator for attenuating a signal without phase shift wherein the improvement comprises an input terminal adapted for receiving said signal; a differential capacitor having first and second stator plates and at least one rotor plate; first and second inductors having equal inductance; a first tank circuit being made up of said first inductor connected in parallel with said first stator plate and said rotor plate; a second tank circuit being made up of said second inductor connected in parallel with said second stator plate and said rotor plate; first resistor connected in parallel with said first inductor; an adjustable capacitor connected across said first and second stator plates; each tank circuit further comprising an additional adjustable capacitor connected in parallel with the inductor of the tank circuit; an output terminal; said second inductor having a tap connection; a second resistor; a still further adjustable capacitor having one end connected to the tapped inductor and the other end connected to the output terminal and one end of said second resistor; and the other end of said second resistor being connected to the rotor plate.

* * * * *

PO-1050
(5/69)

UNITED STATES PATENT OFFICE
CERTIFICATE OF CORRECTION

Patent No. 3,693,117 Dated September 19, 1972

Inventor(s) Robert E. Byrns, Hugh W. Gouldthorpe and Vernon L. Lamison

It is certified that error appears in the above-identified patent and that said Letters Patent are hereby corrected as shown below:

In the heading add the following:

--[73] Assignee: The United States of America as represented by the Secretary of the Army--.

Signed and sealed this 13th day of March 1973.

(SEAL)
Attest:

EDWARD M.FLETCHER,JR.
Attesting Officer

ROBERT GOTTSCHALK
Commissioner of Patents